United States Patent [19]
Sekine et al.

[11] Patent Number: 5,834,041
[45] Date of Patent: Nov. 10, 1998

[54] VALVE GATE APPARATUS FOR AN INJECTION MOLD

[76] Inventors: Kazuyoshi Sekine, c/o, Kabushiki Kaisha Yoshino Kogyosho, 2-6, Oojima 3-chome, Koto-ku, Tokyo; Kin-ichi Yokoyama, c/o, Seiki Kabushiki Kaisha, Maruyama Bldg., 2-5, Shimbashi 2-chome, Minato-ku, Tokyo, both of Japan

[21] Appl. No.: 660,792

[22] Filed: Jun. 5, 1996

[30] Foreign Application Priority Data

May 20, 1996 [JP] Japan ................................. 8-124716

[51] Int. Cl.$^6$ ........................................... B29C 45/23
[52] U.S. Cl. ..................... 425/549; 264/328.15; 425/564
[58] Field of Search ................... 425/564, 549, 425/547; 264/328.15

[56] References Cited

U.S. PATENT DOCUMENTS

| | | | |
|---|---|---|---|
| 4,412,807 | 11/1983 | York | 425/564 |
| 4,712,995 | 12/1987 | Basnett | 425/564 |
| 5,470,219 | 11/1995 | Yokoyama et al. | 425/549 |
| 5,533,882 | 7/1996 | Gessner et al. | 425/564 |

Primary Examiner—Tim Heitbrink

[57] ABSTRACT

Disclosed is a valve gate apparatus for an injection mold comprising: a valve gate 6 in communication with a mold cavity; a valve pin 3 adapted to be actuated to open and close the valve gate 6, received therein for reciprocal movement in the axial direction of a probe assembly 1 equipped with a body heater 2; and a resin melt passage 7 formed within the probe assembly 1 at the position where the valve pin 3 is opened; the resin melt passage 7 having a gradually curved region 8 formed adjacent the opening end of the passage.

13 Claims, 8 Drawing Sheets

VALVE GATE APPARATUS FOR AN INJECTION MOLD

BACKGROUND OF THE INVENTION

1. Field of the invention

The present invention relates to a valve gate apparatus for an injection mold for improved injection molding capable of producing high-quality molded products.

2. Brief Description of the Prior Art

In general, for the valve gate apparatus of the type mentioned above, a number of improvements have been proposed with reference to resin flow passages at the process of injection molding as well as to the structures of reciprocal movement of the valve pin for opening/closing the gate. Most of such apparatus possesses the same arrangement location as the valve pin along the reciprocal movement position of valve pin received in probe assembly, or having a structure so as to be separate from the valve pin.

In either arrangement thereof, an inclined corner region formed obliquely relative to the gate is provided within the melt passage, in which the flow of the resin melt is gradually oriented toward the axis of the valve pin.

For instance, so long as in the structure disclosed in laid-open patent publication No. 1-192516 (1989), because of an annular nozzle duct (chamber) which is provided around the valve pin positioned next to the corner region, a branch or turbulent flow of resin melt introduced into the nozzle duct would not be prevented.

In addition, in the structure disclosed in laid-open patent publication No. 2-233224 (1990), although the resin melt is adapted to be flowed separately from the periphery of reciprocal movement passage of the valve pin, actually the resin melt flow is branched by four resin passages formed to have a circular section, and, in addition, the valve pin is opened in a gap for heat insulation which is placed adjacent the gate in the vicinity of the tip end of the valve pin so as to derive the resin to be mixed and injected. Therefore, generation of the branch flow is inevitable, and the retention of resin at the gap region is not prevented. Accordingly the provision of a corner region having a structure providing a flow speed variation is indispensable.

In addition, in the structure disclosed in laid-open patent publication No. 2-179718 (1990) (corresponding to allowed patent publication No. 7-29341 (1995), a corner portion is formed on the upper side of a probe assembly, and a resin melt passage of a crescent form in section is formed on one side of a reciprocated path of a valve pin.

In other words, in either structure disclosed in laid-open patent publication No. 1-192516 (1989) or No. 2-233224 (1990), an imbalance of the resin melt flow during molding operation, such as branched or turbulent flow or further retention of flow, occurs, and, caused by such an imbalance, the product suffers from the weld unevenly generated. Especially in producing disks using materials such as polycarbonate or acryl resin, the defects are revealed as portions of weld and distortions therearound to reduce the yield of production.

Also, according to the technology disclosed in laid-open patent publication No. 2-179718 (1990), since the resin flow passage is in the form of a crescent in section, a difference of flow rate is caused between the thin portion and the thick portion, and the resin with different densities is injected, causing distortion of products. Moreover, the resin having a reduced flow rate requires a long retention time, and degradation of physical properties or yellowing, especially in the case of resins of poor thermal stability, is often caused. When a replacement of colors is required, the portion having a low flow rate is hardly varied in its color, and therefore a large amount of resin materials will be wasted.

In addition, with passages having a crescent form in section, the length of the periphery is elongated compared with the flowing section, and an increased wall resistance causes an increase of the pressure losses.

In addition thereto, also when a valve pin or a guide case exists in the flowing passage, or in the case of a plurality of passages, the wall resistance is increased relative to the flowing section, which leads to increase of pressure losses.

Also in the range of technology disclosed in the aforementioned publications, since the probe assembly is heated only by the body heater, having no heating means at the end of the probe, the resin tends to be cooled and solidified owing to temperature drop at the probe end, and, accordingly, causing the increase of flowing resistance: as a result, finishing of products, replacement of resins or color replacement are difficult.

SUMMARY OF THE INVENTION

In view of the above, the present invention is to provide a valve gate apparatus for injection mold, in which a resin melt passage is formed independently from the reciprocal motion of a valve pin; the passage is opened with its end through a gradually curved region and opened adjacent the gate, thereby completely preventing a branched flow to suspend strength decrease of molded products to steadily provide a state of uniform communication of the resin melt; and producing high-quality and uniform mold products free from weld, distortion or any other defects.

The afore-mentioned problems have been solved by each of constructions described hereinafter:

(1) A valve gated apparatus for an injection mold comprising: a valve gate in communication with a mold cavity; a valve pin adapted to be actuated to open and close the valve gate, received therein for reciprocal movement in the axial direction of a probe assembly; and a resin melt passage formed within the probe assembly at the position where the valve pin is opened; the resin melt passage having a gradually curved region formed adjacent the opening end of the passage;

(2) A valve gate apparatus according to item (1), wherein a tip heater is seated around the valve pin, the valve pin being adapted to be seated in the position adjacent the valve pin when the valve pin is in the closed position;

(3) A valve gate apparatus according to item (1) or (2), wherein the probe assembly comprising an outer probe member and an inner probe member: the outer probe member including a fit bore, a gradually curved region, and
a body heater; and the inner probe member including a valve pin receiving bore, and a resin melt passage in communication with the curved region;

(4) A valve gate apparatus according to item (3), wherein the outer probe member is provided with a conical head, and a end guide portion is formed on the conical head for positioning with a stationary mold form;

(5) A valve gate apparatus according to item (3), wherein the valve pin receiving bore is provided with a gap for allowing communication of the resin melt between the valve pin reciprocated through the fit bore;

(6) A valve gate apparatus according to items (1) to (5), wherein the valve pin receiving bore and a fit bore are axially formed away from the central axis of the probe assembly; and (7) A valve gate apparatus according to item (3), wherein a heat pipe is axially formed within the inner probe member.

The resin melt is fed through a resin melt passage formed in a probe assembly, through a gradually curved region, further through a fit bore formed in the position where an end of valve pin is reciprocally received, into a cavity from a gate.

In summary, the provision including the gradually curved region provides advantages of a uniform flow of melt and a flow without involving any retention of the melt, which can be passed through the gap formed between the fit bore and valve pin and is advantageously prevented from being blocked due to retention of the melt.

In addition, the balance between the gates including two gates or more is maintained by regulating the temperature of the body of the probe assembly by means of the body heater. Further, instead of the disadvantage of varying the dimension of the gate diameter itself as performed conventionally, merely the extent of opening of the valve pin may be regulated or narrowed, so as to narrow the vicinity of the fit bore corresponding to the gradually curved region.

DETAILED DESCRIPTION OF THE PREFERRED EMBODIMENTS

Embodiments of the invention are hereinafter described. The First Embodiment shown in FIGS. 1 to 3

Figure 1:
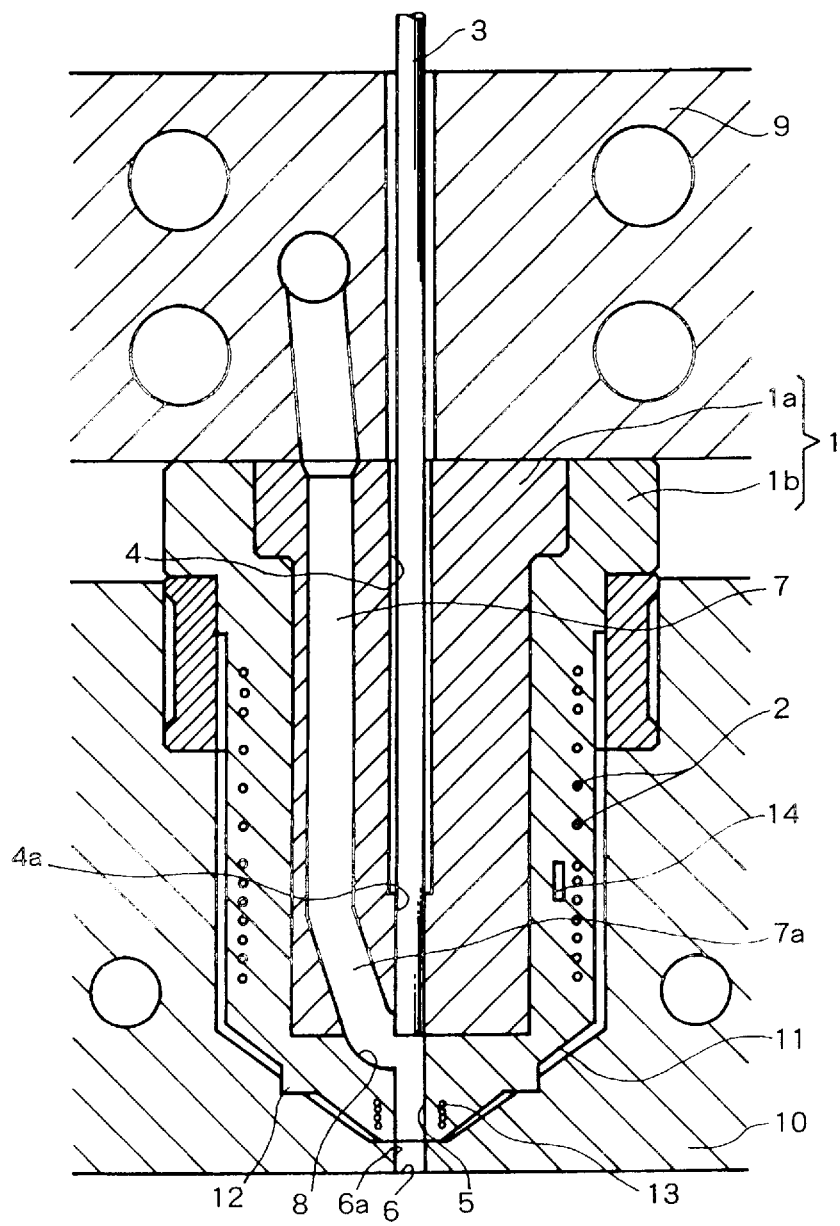
FIG. 1 is a sectional view of an embodiment of a valve gate apparatus according to the present invention.
Figure 2:
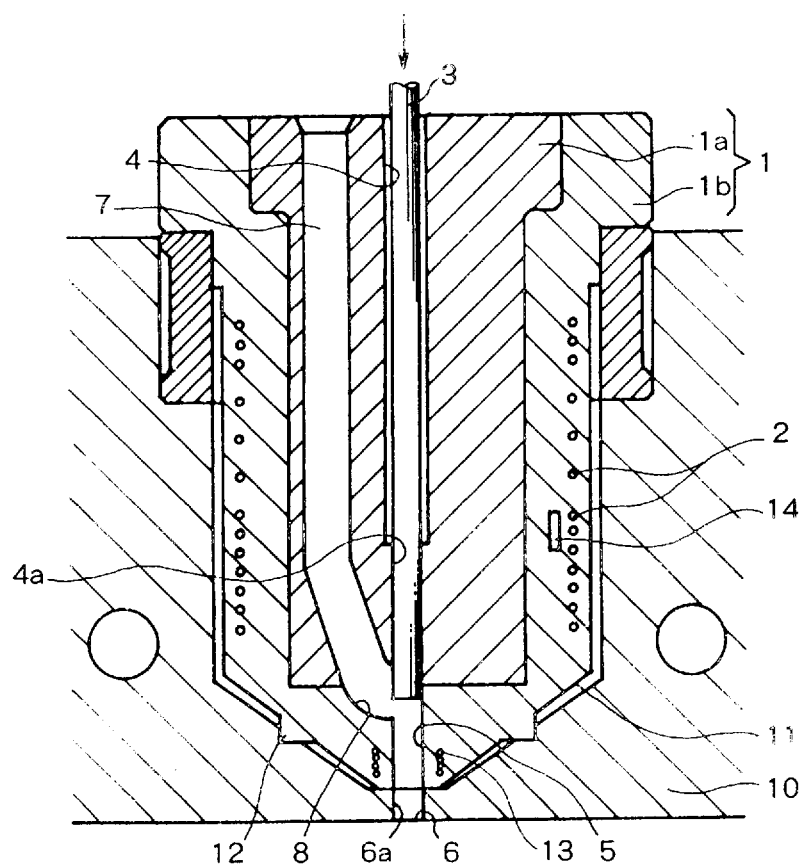
FIG. 2 is a sectional view illustrating a step of operation of the assembly in FIG.1.
Figure 3:
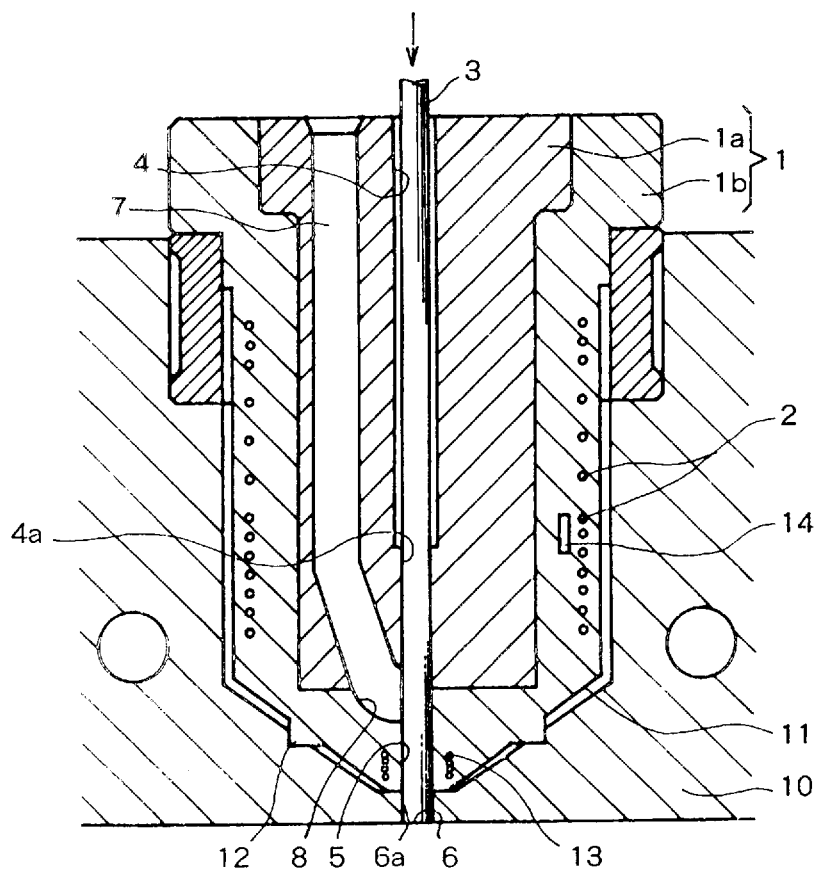
FIG. 3 is a sectional view illustrating another step of operation.

FIGS. 1 to 3 show a fundamental embodiment of the invention, wherein each of drawings shows, respectively, a condition with a valve pin opened, the valve pin with reduced opening rate, and the valve pin with the closed valve gate.

A probe assembly 1 is formed of an inner probe 1a integrally with an outer probe 1b.

A body heater 2 is formed of a coil heater wound around an inner probe 1a. A valve pin 3 is received longitudinally within a valve pin receiving bore 4 which is longitudinally formed within the inner probe 1a, and is allowed for reciprocal movement to open and close a valve gate 6 in communication with a mold cavity, not shown.

The reciprocal movement of valve pin 3 is ensured by means of a valve pin guide 4a, and further the valve gate 6 is closed by way of the tip end of valve pin 3 snugly received into a gate bore 6a of valve gate 6.

A resin melt passage 7, formed separately away from the valve pin 4, is formed with a transverse section as circular as possible, for reducing the flow resistance acted on resin melt. A gradually curved region 8 is provided in outer probe 1b, and in communication with receiving bore 5. Further, instead of forming such an inclined region 7a, another arrangement is also possible in the manner to provide a gentle inclination for the melt passage 7.

A manifold 9 is formed so as to be attached by each base portion of a plurality of probe members 1. A stationary mold form 10 for injection molding is formed so as to be engaged and secured by a tip guide 12, which is provided on a conical head 11 at the lower side of probe assembly 1. Formed within the stationary mold form 10 is the valve gate 6 which actually includes the gate bore 6a. A tip heater 13 is provided within the outer probe member 1b so as to surround pin 3 receiving bore 5, and a temperature sensor 14 is embedded within the member 1b.

In addition, for both tip heater 13 and body heater 2, either a separate control using two circuits or more, or a single circuit control is selectively employed.

The operation of the invention is hereinafter described in accordance with the construction mentioned above.

The molten resin injected from manifold 9 flows into each mold form, through resin melt flow passage 7 and, from inclined region 7a, via a gradually curved region 8, flows to the lower region of valve pin receiving bore 4. Further, the resin melt is, through tip bore 5, injected from the valve gate 6 into a cavity formed by the stationary mold 10 and a movable mold, which is not shown.

In the course of the afore-mentioned process, as there is no undesirable dispersion such as caused by a sharp inflection or branch flow, the resin melt flows into an almost straight flow movement, thereby weld, distortion or any other defects being effectively prevented.

Upon completion of the injection operation, the valve pin 3 descends through the state of FIG. 2 to the state of FIG. 3 to close the valve gate 6, and thereafter the mold closing operation is started.

After a predetermined period of time of mold closing operation, the stationary mold 10 moves rearwardly and a mold separating operation is performed to eject the molded article. Thereafter, the stationary mold is again moved to close the mold. During such operation, the valve pin 3 is returned through the state of FIG. 2 to that shown in FIG. 1.

After completion of the first injection molding operation above, the same operation can be repeated for the purpose of continuous molding operations.

As can be seen by the above description, the resin melt is, through the resin melt passage 7 formed completely independent from the valve pin 3 and without incorporating any branch flow, fed through the inclined region 7a and gradually curved region 8, and via the lowered end of valve pin receiving bore 4 and tip bore 5 and further the gate 6 into one cavity very smoothly. Through these processes, reduction of strength of products is prevented, the generation of degradation such as weld or deformation is prevented, and mold products of sufficiently high quality are produced with higher yield of production.

In addition, just before the injection operation, the tip heater 13 is operated so as to re-heat and re-melt the resin, which has been once cooled in the semi-solid or semi-hardened state and still maintained within the bore 5, to advantageously permit the injection operation to be easily and efficiently performed. Also, the tip heater 13 is preferably formed of a densely wound coil heater, which is advantageous for pre-heating for compensating temperature drops caused adjacent the bore 5 at the end of probe assembly 1, or for the other control operation, such as in the form of providing temperature differences in accordance with the molding cycle by way of intermittent heating.

As previously stated, two sets of heaters, that is, a body and tip heaters 2 and 13, are installed for the resin melt flowing within the passage 7. The body heater 2 is formed so that the wound pitch of the coil thereof varies along the longitudinal direction, so as to provide a wound amount of higher density for the region where the temperature is likely to be lowered to achieve a uniform temperature distribution. In addition, by providing temperature control achieved by a temperature sensor 14, even a resin having a narrow temperature tolerance can be molded.

The conical head portion 11 of probe assembly 1 is formed so as to be retained to stationary form 10, and therefore the centering of the fit bore 5, which supports valve pin 5, with valve gate 6 is easily achieved.

The Second Embodiment

Figure 4:
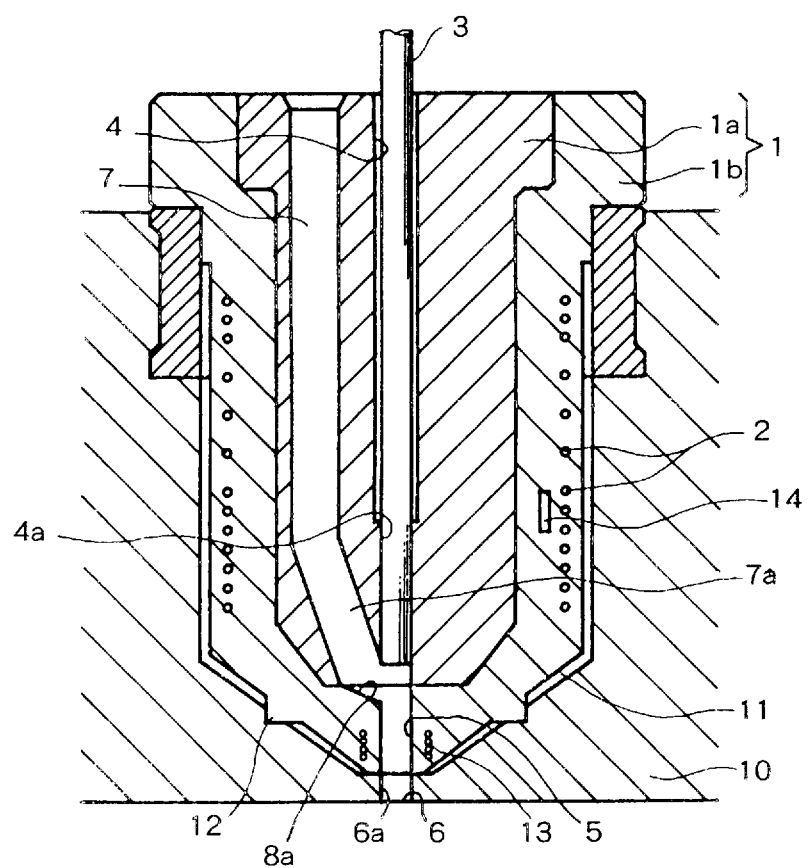
FIG. 4 is a sectional view of a second embodiment of a valve gate apparatus.

As shown in FIG. 4, the second embodiment is formed by replacing substantially the gradually curved region 8, provided in the outer probe 1b of the first embodiment, with a region 8a formed in a cutout configuration, the valve pin 3 is slightly forwardly shifted so as to receive a transversal force by resin melt passage 7 which corresponds to a runner.

The effect of the embodiment is substantially the same as that embodied as the first embodiment, and the description in detail is omitted.

The Third Embodiment

Figure 5:
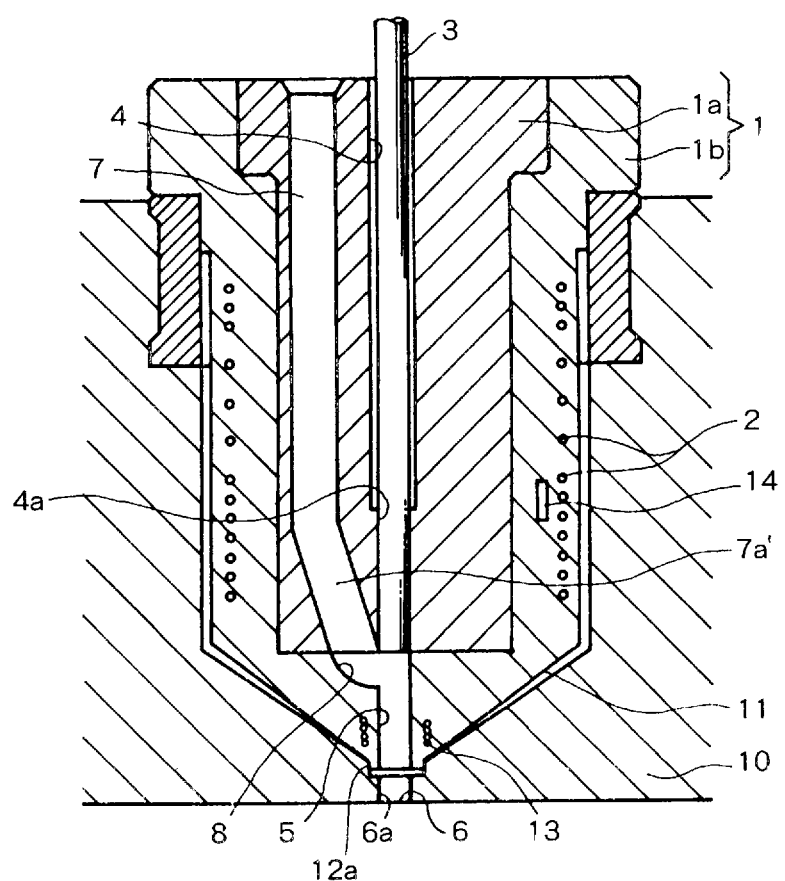
FIG. 5 is a sectional view of a third embodiment of a valve gate apparatus.

The third embodiment as shown in FIG. 5 is merely different in the form of the tip end portion as compared with the first embodiment. As shown in FIG. 5, there is provided an end guide region 12a formed as an annular projection in the position of the endmost of the conically configured head portion 11 of probe assembly 1, concentrically with the bore 5 of valve pin 3 so as to surround the bore. In addition, a recess is formed on the periphery of the stationary valve gate 6 so as to snugly fit with the end guide region 12a mentioned above, so as to be properly assembled under the condition of correct centering.

Also, the effect thereof is substantially the same as the first embodiment.

The Fourth Embodiment

Figure 6:
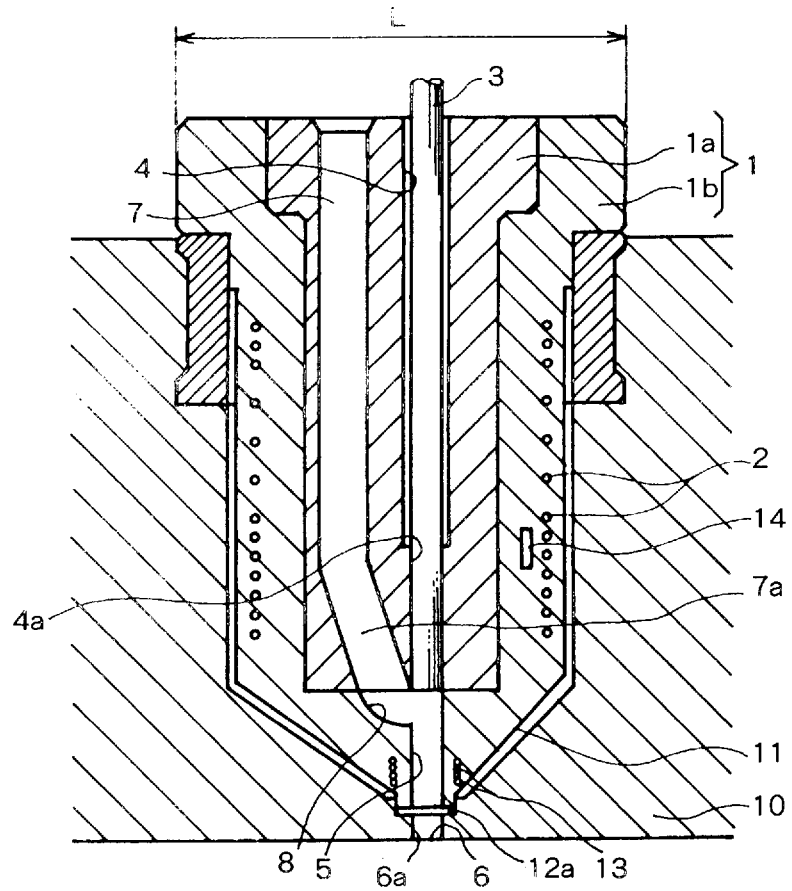
FIG. 6 is a sectional view of a fourth embodiment of a valve gate apparatus.
Figure 6:
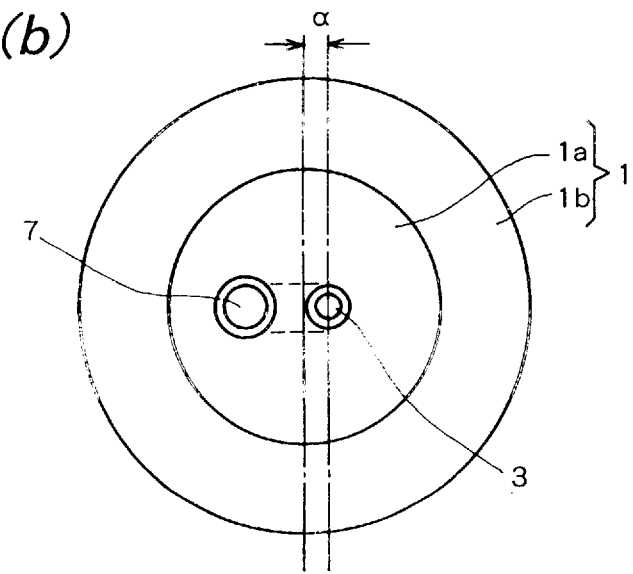

FIGS. 6(a) and 6(b) show another embodiment, in which a valve pin 3 is positioned so as to be offset from the central axis of probe assembly 1 by a relatively small distance "alpha", thereby the melt passage 7 being also allowed to be formed longitudinally adjacent and in parallel with the central axis, and, accordingly, the probe assembly 1 may have an outer diameter L less than that in either of the first, second or third embodiments, which contributes to miniaturization of the entire arrangement.

The Fifth Embodiment

Figure 7:
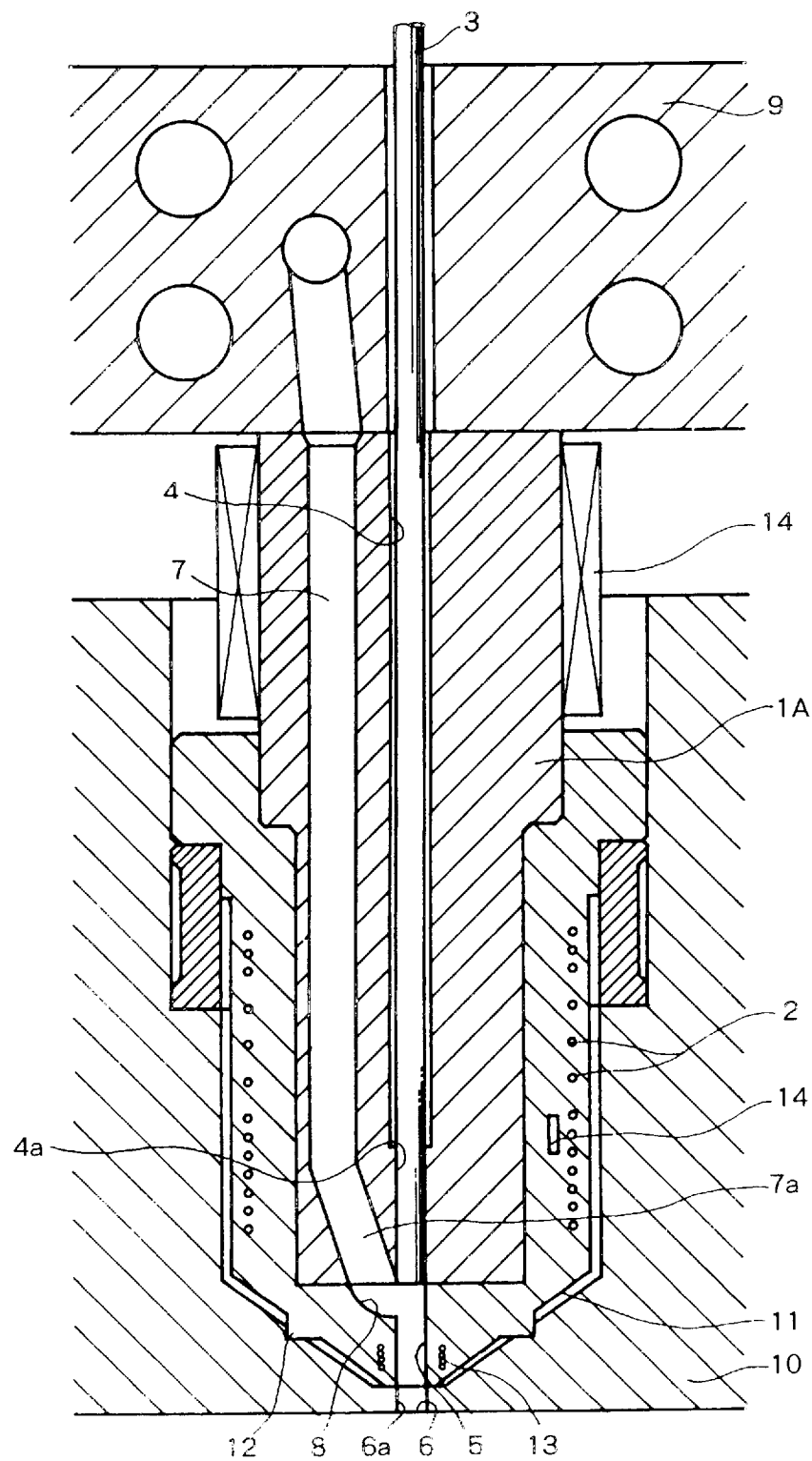
FIG. 7 is a sectional view of a fifth embodiment of a valve gate apparatus.

FIG. 7 shows a still another embodiment, which is featured in that the probe assembly 1 is composed of an elongated probe assembly 1A which is longer than that in any of other embodiments. Further, the embodiment is featured by a heater 14, the winding of which is wound in the range from the lower side of manifold 9, which corresponds to the increased part of the elongated probe, to the upper side of probe assembly 1A, thereby to compensate heat conservation for the resin melt which circulates in the elongated region.

The Sixth Embodiment

Figure 8:
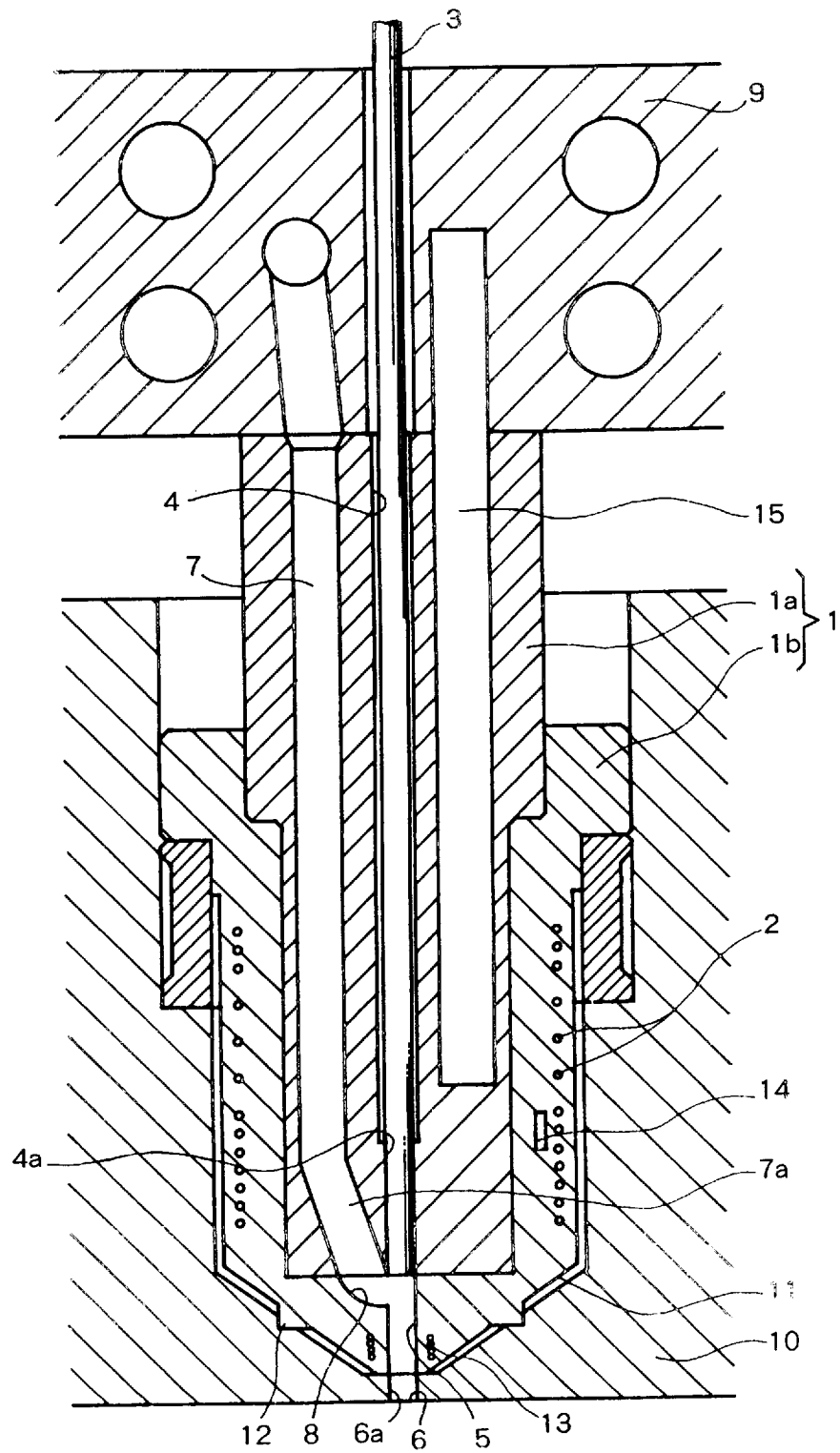
FIG. 8 is a sectional view of a sixth embodiment of a valve gate apparatus.

FIG. 8 shows a further embodiment, which is featured by a heat pipe 15, which is enclosed within the probe assembly 1 and which further extends into the manifold 9, in addition to the body heater 2 provided in the embodiment of FIG. 7. As a result, heating of the elongated region of resin melt passage 7 is compensated, and the temperature of the resin melt enclosed within the passage 7 is more uniformly maintained.

The other advantages or effects of fourth to sixth embodiments are the same as those of the afore-mentioned embodiments.

According to the invention, excellent molded products with extremely high quality are produced, and the generation of weld, distortion or any other defects is sufficiently prevented.

The centering between the bore 5, which supports the valve pin 5, and valve gate 6 is easily and correctly achieved.

Further, according to the invention, the selection of materials is such that, for instance, the inner probe member may be formed of a high thermal conductive material such as Be—Cu, and the outer probe member of a wear resistant and rigid material such as steel.

By uniform temperature distribution, an excellent finishing property, improved ability of resin replacement, or color replacement are provided, and also a low pressure molding with a reduced pressure loss is possible.

Even though a small amount the resin retained within the bore 5 is solidified, it is again returned to the melt state through re-heating by means of the tip heater 13, and thereby gate seal is retarded to appropriately apply a supplemental pressure to obtain products without having uneven mold shrinkage.

In addition, the balance between the gates including two gates or more is maintained by regulating the temperature of the body of the probe assembly by means of the body heater. Further instead of the disadvantage of varying the dimension of the gate diameter itself as performed conventionally, merely the extent of opening of the valve pin may be regulated or narrowed, so as to broaden the adjusting range of balance.

What is claimed is:

1. A valve gate apparatus for an injection mold having a mold cavity comprising:
    a probe assembly extending in an axial direction;
    a valve gate coupled to the probe assembly in communication with a mold cavity; and
    a valve pin adapted to be actuated to open and close said valve gate and received in the gate for reciprocal movement in the axial direction of the probe assembly;
    a resin melt passage being formed in fluid communication with the gate within said probe assembly and having a portion thereof located at a position where the pin is opened, said passage having an opening at an end thereof at said portion;
    said resin melt passage having a gradually curved region formed adjacent to the opening end thereof.

2. A valve gate apparatus according to claim 1, including a tip heater wherein the tip heater is seated around said valve gate, said valve pin being adapted to be placed in the position adjacent to said heater when the valve pin is in the gate closed position.

3. A valve gate apparatus according to claim 1, wherein said probe assembly comprises an outer probe member and an inner probe member:
    said outer probe member having a tip having a bore for receiving an end of said valve pin and to provide a conduit to allow said resin melt to flow, said gradually curved region forming said end of said passage and in fluid communication with said tip bore, and including a body heater; and
    said inner probe member including a valve pin receiving bore formed within said outer probe member and aligned with said tip bore, and having a resin melt passage in communication with said curved region.

4. A valve gate apparatus according to claim 3, wherein said outer probe member is provided with a conical head, and an end guide portion is formed on said conical head for positioning with a stationary mold form.

5. A valve gate apparatus according to claim 3, wherein said valve pin receiving bore is provided with a gap for allowing communication of the resin melt between said valve pin reciprocated through said tip bore.

6. A valve gate apparatus according to any one of claims 1 to 5, wherein said valve pin receiving tip bore and a bore are axially formed spaced offset from the central axis of said probe assembly.

7. A valve gate apparatus according to claim 3, wherein a heat pipe is axially formed within said inner probe member.

8. A valve gate apparatus for an injection mold having a mold cavity comprising:

a probe assembly including inner and outer probe members extending in an axial direction;

a valve gate coupled to the probe assembly in fluid communication with said mold cavity;

a valve pin movably secured to the probe assembly and adapted to be actuated to open and close said valve gate by reciprocal movement relative to and in the axial direction of the probe assembly;

said inner probe member having a resin melt passage, said passage having an opening at an end thereof in fluid communication with the valve gate;

said outer and inner probe members each comprising a one piece construction, the outer probe member including a tip having a bore in fluid communication with said passage opening, said tip bore for receiving an end of said valve pin for providing a path in which said resin melt flows from said passage to the valve gate, said inner probe member having a valve pin receiving bore aligned with said tip bore; and a body heater in said outer probe member for heating said probe assembly.

9. A valve gate apparatus for an injection mold having a mold cavity comprising:

a probe assembly comprising inner and outer probe members having a central longitudinal axis, said members extending in an axial direction;

a valve gate coupled to the probe assembly in communication with said mold cavity;

a valve pin selectively received in the gate and located in a valve pin receiving bore in the inner probe member, said pin being adapted to be actuated to open and close said valve gate by reciprocal movement relative to and in the axial direction; and a resin melt passage within one of said inner and outer probe members and having an opening at a passage end in fluid communication with the gate at a position where the gate is opened;

said outer probe member including a tip having a bore in fluid communication with said passage opening, said tip bore for receiving an end of said valve pin for providing a path in which said resin melt flows from said passage to the valve gate, said inner probe member having a valve pin receiving bore aligned with said tip bore;

said tip bore and valve pin receiving bore being axially aligned on a second axis offset from said central longitudinal axis.

10. The apparatus according to claim 9 wherein a majority portion of the resin melt passage is in the inner probe member, the outer probe member including a minority portion of the resin melt passage.

11. The apparatus of claim 10 wherein said resin passage majority portion has at least a major portion thereof extending substantially parallel to the axial direction, said minority portion further including a gradually curved region in fluid communication with the tip bore.

12. The apparatus of claim 11 wherein the gradually curved region is wholly within the outer probe member tip.

13. The apparatus of claim 12 wherein the resin passage has an inclined portion in fluid communication between the at least major portion and the gradually curved region.

* * * * *

UNITED STATES PATENT AND TRADEMARK OFFICE
CERTIFICATE OF CORRECTION

PATENT NO. : 5,834,041
DATED : November 10, 1998
INVENTOR(S) : Kazuyoshi Sekine, Japan; Kinichi Yokoyama, Japan It is certified that error appears in the above-indentified patent and that said Letters Patent is hereby corrected as shown below:

Title Page:    Add:

-- [73] Assignee Kabushiki Kaisha Yoshino Kogyosho and Seiki Kabushiki Kaisha, both of Tokyo, Japan --
Claim 6, line 2 (col.7, line 12), delete "tip" and after "a" insert -- tip --.

Signed and Sealed this

Ninth Day of November, 1999

Attest:

Q. TODD DICKINSON

Attesting Officer

Acting Commissioner of Patents and Trademarks